(12) United States Patent  (10) Patent No.: US 7,954,107 B2
Mao et al. (45) Date of Patent: May 31, 2011

(54) METHOD AND SYSTEM FOR INTEGRATING THE EXISTING WEB-BASED SYSTEM

(75) Inventors: Xinsheng Mao, Beijing (CN); Jia Tan, Beijing (CN); Zhi Rong Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 11/839,652

(22) Filed: Aug. 16, 2007

(65) Prior Publication Data

US 2008/0082987 A1    Apr. 3, 2008

(30) Foreign Application Priority Data

Aug. 18, 2006  (CN) .......................... 2006 1 0115563

(51) Int. Cl.
*G06F 3/00* (2006.01)
*G06F 9/44* (2006.01)
(52) U.S. Cl. ........................................ 719/310; 717/100
(58) Field of Classification Search .................. 719/310; 717/100
See application file for complete search history.

(56) References Cited

U.S. PATENT DOCUMENTS

2005/0144226 A1    6/2005  Purewal

OTHER PUBLICATIONS

Peter Jarvis, Exploiting AI Technologies to Realise Adaptive Workflow Systems, 1999.*

* cited by examiner

*Primary Examiner* — Lechi Truong (57) ABSTRACT

The present invention provides a service-oriented system comprises: a service inlet for receiving a service request containing an input data set submitted by a user; a service proxy interface formed by integrating an existing web-based application, for transforming the input data set in the service request submitted by the user into input parameters recognizable by the requested service and loading a model definition document corresponding to the service according to the service request submitted by the user, the model definition document being formed by integrating the existing web-based application; and an execution engine for interacting with an external resource according to the input parameters transformed by the service proxy interface and returning the information obtained from the external resource to the service proxy interface.

21 Claims, 4 Drawing Sheets

METHOD AND SYSTEM FOR INTEGRATING THE EXISTING WEB-BASED SYSTEM

TECHNICAL FIELD

The present invention relates to integrating an existing web-based application system into a service-oriented system, particularly to a method of integrating an existing web-based application system into a service-oriented system by using a model driven approach and a service-oriented system formed thereby, as well as a method of providing such a service to users.

BACKGROUND OF THE INVENTION

When integrating or reusing the existing web-based systems, sometimes the existing web-based systems are not well designed for external systems to access. There is no API layer for others to interact with. Worse, the presentation logics, business logics and data logics are usually mixed up without good separation of concerns. So the only way for others to interact with such systems is through web pages, HTML/XHTML or other markup language, over HTTP/HTTPS like a web browser. With such a situation, how could the human-machine interaction approach be turned into a machine-machine interaction approach so as to be able to expose their functions and data as reusable services for application integration?

There are some existing solutions for such a scenario;
1. System re-engineering: re-engineer the existing system to expose the business logics through well designed machine to-machine accessible interface, such as EJB, Web Services.
2. Customizing adapters: develop custom adapters for specific pages to extract the useful information; repeatedly write hundreds of codes to parse the structure of the HTML tree, extract the useful information and return the result for every web page; collaborate the result of each page to compose the useful information, The drawbacks of above approaches:

Usually, system re-engineering needs to analyze the existing legacy system architecture and code to have a deep understanding of the system architecture; to mine and re-engineer the existing assets to make it well structured and layered; and to expose the business logics through well designed interfaces. Therefore, the re-engineering work is too heavy or complicated to afford. When the system is not well designed, the needed efforts might be more than rebuilding the system from scratch. Usually; the older system can hardly find a maintenance document and a detailed description for code design. There is no design documentation or the document is so out-dated compared with the evolving code that it is meaningless, and then the re-engineering becomes a high risk, since re-engineering developers often did not attend the existing systems development at all. Sometimes there is no source code but the binary image, which leaves you no way to do the re-engineering.

The custom adapter approach needs to write different codes for each different scenario, respectively; and achieve the object by analyzing web pages and simulating a flow. This kind of approach is not a modeling one, and has insufficient automatization, low efficiency and a lot of repetitive works. Further, if the flow has a certain change or the page structure changes, the effort needed to modify code is great. Specifically, this approach is good for extracting information from a few specific pages, but when dealing with a large amount of pages, it is very time-consuming and not so efficient because it does not have a unified way to deal with all kinds of situations. Worse, there is no mechanism in this approach to expose functions into a logically cohesive and complete service for use in application integration, say nothing of security and session management.

SUMMARY OF THE INVENTION

In practice, a lot of existing enterprise applications are based on HTML (Web). But because of the prior art limitation then, these applications do not well separate business logics from presentation, logics or do not have proper interfaces to transform the applications into services. When an enterprise wants to transfer to a service-based architecture, it becomes a task needing a lot of efforts and being almost impossible to modify the existing application system. In this case, if starting directly with a final presentation result page, providing a proper meta-model definition to a human-machine interaction conforming a certain rule without manual decision and input substantially in the interaction process, and achieving a final result by establishing a model instance for the meta-model to be interpreted and executed automatically by the machine, the modification will be greatly simplified.

Therefore, an object of the present invention is to provide a method of integrating an existing web-based application into a service, which can simplify the effort to integrate the existing web-based application, into the service. The method also can perform concentrated control on some attributes of security and session and exception handling.

Another object of the present invention is to provide a service-oriented system and a method of providing services to users, which can integrate an existing web-based application easily and efficiently and realize the reusability of integrating an existing web-based application into a service.

In order to achieve the above mentioned objects, the present invention provides a service-oriented system for integrating an existing web-based application to form a service to be provided to users, the system comprises: a service inlet for receiving a service request containing an input data set submitted by a user; a service proxy interface formed by integrating the existing web-based application, for transforming the input data set in the service request submitted by the user into input parameters recognizable by the requested service and loading a model definition document corresponding to the service according to the service request submitted by the user, the model definition document being formed by integrating the existing web-based application; and an execution engine for interacting with an external resource according to the input parameters transformed by the service proxy interface and returning the information obtained from the external resource to the service proxy interface, The present invention also provides a method of providing a service to users, the service being formed by integrating an existing web-based application, the method comprising: providing a service inlet; receiving a service request containing an input data set submitted by a user at the service inlet; transforming the input data set in the service request submitted by the user into input parameters recognizable by the requested service and loading a model definition document corresponding to the service according to the service request submitted by the user, the model definition document being formed by integrating the existing web-based application; and interacting with an external resource according to the transformed input parameters and returning information obtained from the external resource to the user.

The present invention, also provides a method of integrating an existing web-based application into a service, comprising steps of: providing a meta-model; conducting service model definition for the existing web-based application according to the meta-model; transforming the formed service model into service packing codes and a model definition, document of the service; and deploying the service packing codes to generate a service proxy interface in a runtime environment so as to be invoked by a client of the service.

The present invention provides a meta-model with a strong adaptability and a method of using the meta-model to transform an existing HTML(Web)-based application into various needed service. The present invention comprises a meta-model for defining common key elements for browsing HTML, such as hot-point data of a page, link transfer between pages, security log-on ID of a page and etc.; an execution engine for automatically traversing corresponding pages and extracting result defined by the model by being input a model instance defined by a user; a visualized graphic tool for defining the model instance to help the user to define a service needed by himself and automatically generating a service interface and execution codes based on the meta-model.

The present invention is based on a meta-model that can describe the existing web-based systems, such as hot-points of an interested page, how a flow of pages are organized for a cohesive and complete service logic, and related exception handling, security handling and session management. With such a meta-model, it can model a service into a flow of the processed pages, while the processing is modeled by hot-points which help to extract information from pages and decide how to interact with the existing web systems. Then an MDD approach (model-driven approach) is provided to auto-generate the service facade. The meta-model is powerful enough to define most common scenarios efficiently and completely.

The present invention could allow the developer to generate a needed service through defining some key data by starting and checking only from the presentation layer without researching and modifying the structure and codes of the existing application. This makes it more convenient to construct various needed services from existing HTML applications.

With the present invention, for most of applications of page transferring that substantially do not need a manual intervention, efforts of transformation into service can be greatly simplified. Especially in the case that various conventional complicated HTML-based applications of an enterprise do not have a good interface to be used in the service transformation, the present invention can provide a shortcut for transferring the enterprise into a service-oriented architecture.

It needed to indicate that not all cases can obtain help from the present invention. The present invention is relatively applicable to scenarios that have relatively fixed flow and page structure or have an definite regularity and can be enumerated, but the present invention can be hardly applicable to the following scenarios where;

1) in the course of page transferring, a person(s) is needed substantially to perform subjective determination and input;

2) the page transferring of existing applications involves dynamic logics, for example, the page structure and elements are dynamically controlled by a client script or a localized control, and are lack of a regularity and can not be enumerated. For example, sometimes there are interaction-embedded logics in the pages like Javascript or even ActiveX control or other plug-ins, then the meta-model in the present invention can not define them.

Since for most web-based applications, especially the enterprise level applications, the page structure and flow is relatively stable and static, the applicable range of the present invention is large.

The advantages provided by the present invention is listed as follows:

There is no need of the re-engineering work and analyzing current system's internal structure;

It only need to describe the pages using the meta-model instead of to create custom code for each page, so it is much more efficient, flexible and takes much less efforts;

It is easy to use;

It has a unified way to deal with cross-cutting concerns, such as session management and security, which makes enterprise level application transformation more cohesive.

BEST MODE FOR CARRYING OUT THE INVENTION

The model-driven approach according to the present invention provides a meta-model which facilitates the designer to specify various reusing elements for a legacy web application. Model definition in the approach is very important: it not only describes the programmable interface of the legacy application, but also helps the runtime engine to extract the data snippet and reconstruct the data object from the web pages. The meta-model according to the present invention includes the following main construction: hot-point element, message element, page element, page-flow element, and qualify element. Hot-point element defines the extraction criteria of semantic data snippets in web pages. It usually contains some extraction logic. Message element specifies the internal structure of a message, which will build from hot-point data snippets. Page element describes the external resource partner and page-flow element defines the composition logic on the page set Qualify element satisfies the non-functional specification requirement and makes the service be stateful. In fact, the meta-model provides a declarative programming language. Based on the meta-model, the designer could specify all the reusing logics using declarative style and does not need to write any code.

Figure 1:
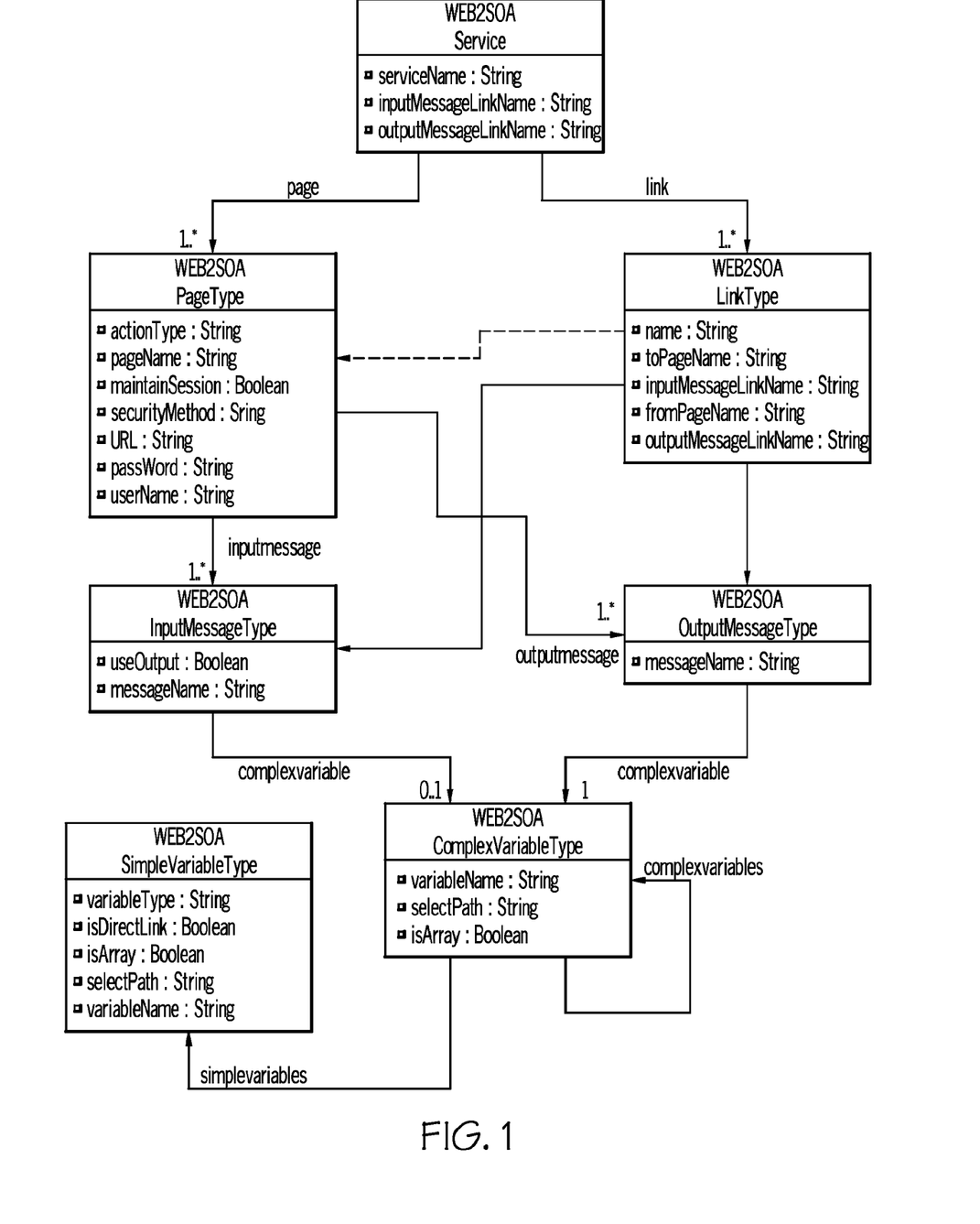
FIG. 1 illustrates a meta-model definition represented by using UML (unified modeling language) of an embodiment of the present invention.

FIG. 1 illustrates a meta-model definition represented by using UML (unified modeling language) of an embodiment of the present invention.

As mentioned below, the meta-model can be defined strictly based on XML Schema:

```xml
<?xml version="1.0" encoding="UTF-8"?>
<xs:schema xmlns:xs="http://www.w3.org/2001/XML.Schema" xmlns:soa="http://www.ibm.com/soa/service"
targetNamespace="http://www.ibm.com/soa/service" elementFormDefault="qualified">
    <xs:element name="service" type="soa:Service"/>
    <xs:complexType name="Service">
        <xs:sequence>
            <xs:element name="inputMessageLinkName" type="xs:string"/>
            <xs:element name="outputMessageLinkName" type="xs:string"/>
            <xs:element name="page" type="soa:PageType" maxOccurs="unbounded"/>
            <xs:element name="link" type="soa:LinkType" maxOccurs="unbounded"/>
        </xs:sequence>
        <xs:attribute name="serviceName" type="xs:string" use="required"/>
    </xs:complexType>
    <xs:complexType name="PageType">
        <xs:sequence>
            <xs:element name="outputMessage" type="soa:OutputMessageType" maxOccurs="unbounded"/>
            <xs:element name="inputMessage" type="soa:InputMessageType" minOccurs="0"
maxOccurs="unbounded"/>
        </xs:sequence>
        <xs:attribute name="pageName" type="xs:string" use="required"/>
        <xs:attribute name="URL" type="xs:string" use="required"/>
        <xs:attribute name="maintainSession" type="xs:boolean" use="required"/>
        <xs:attribute name="userName" type="xs:string" use="optional"/>
        <xs:attribute name="password" type="xs:string" use="optional"/>
        <xs:attribute name="securityMethod" use="optional">
            <xs:simpleType>
                <xs:restriction base="xs:string">
                    <xs:enumeration value="BASIC"/>
                    <xs:enumeration value="FORM"/>
                </xs:restriction>
            </xs:simpleType>
        </xs:attribute>
        <xs:attribute name="actionType" use="required">
            <xs:simpleType>
                <xs:restriction base="xs:string">
                    <xs:enumeration value="GET"/>
                    <xs:enumeration value="POST"/>
                </xs:restriction>
            </xs:simpleType>
        </xs:attribute>
    </xs:complexType>
    <xs:complexType name="LinkType">
        <xs:sequence>
            <xs:element name="fromPageName" type="xs:string" minOccurs="0"/>
            <xs:element name="outputMessageName" type="xs:string" minOccurs="0"/>
            <xs:element name="toPageName" type="xs:string" minOccurs="0"/>
            <xs:element name="inputMessageName" type="xs:string" minOccurs="0"/>
        </xs:sequence>
        <xs:attribute name="name" type="xs:string" use="required"/>
    </xs:complexType>
    <xs:complexType name="InputMessageType">
        <xs:sequence>
            <xs:element name="complexVariable" type="soa:ComplexVariableType" minOccurs="0"/>
        </xs:sequence>
        <xs:attribute name="messageName" type="xs:string" use="required"/>
        <xs:attribute name="useOutput" type="xs:boolean" use="required"/>
    </xs:complexType>
    <xs:complexType name="OutputMessageType">
        <xs:sequence>
            <xs:element name="complexVariable" type="soa:ComplexVariableType"/>
        </xs:sequence>
        <xs:attribute name="messageName" type="xs:string" use="required"/>
    </xs:complexType>
    <xs:complexType name="ComplexVariableType">
        <xs:sequence>
            <xs:element name="simpleVariable" type="soa.SimpleVariableType" minOccurs="0"
maxOccurs="unbounded"/>
            <xs:element name="complexVariable" type="soa:ComplexVariableType" minOccurs="0"
maxOccurs="unbounded"/>
        </xs:sequence>
        <xs:attribute name="variableName" type="xs:string"/>
        <xs:attribute name="selectedPath" type="xs:string"/>
        <xs:attribute name="isArray" type="xs:boolean" default="false"/>
    </xs:complexType>
    <xs:complexType name="SimpleVariableType">
        <xs:attribute name="variableName" type="xs:string" use="required"/>
        <xs:attribute name="isArray" type="xs:boolean" default="false"/>
```

```
            <xs:attribute name="isDirectLink" type="xs:boolean" default="false"/>
            <xs:attribute name="selectPath" type="xs:string" use="required"/>
            <xs:attribute name="varibleType" use="required">
                <xs:simpleType>
                    <xs:restriction base="xs:string">
                        <xs:enumeration value="String"/>
                        <xs:enumeration value="Integer"/>
                    </xs:restriction>
                </xs:simpleType>
            </xs:attribute>
        </xs:complexType>
</xs:schema>
```

The main elements of the meta-model are briefly described as follows:

| Element name | Element description |
|---|---|
| Service | It describes and defines basic information of a service |
| PageType | It describes and defines a page in the course of user interaction |
| LinkType | It describes and defines transferring between pages, including the output from a source page and the input to a destination page |
| InputMessageType | It describes and defines the input to a certain page with one page being capable of having a plurality of possible input message definitions |
| OutputMessageType | It describes and defines the output from a certain page with one page being capable of having a plurality of possible output message definitions |
| SimpleVariableType | It describes and defines a simple form of hot-point data |
| ComplexVariableType | It describes and defines a complex form of hot-point data |

The details of a meta-model according to an embodiment of the present invention will be described below with reference to FIG. 1.

In order to describe the HTML-based page data and flow by using the meta-model various human-machine interaction scenarios can be abstracted into the following several important elements of the meta-model:

1.1 Definition of Service (Service)

A service can act as a root node of the meta-model, it has a service name (ServiceName), an input message link name (inputMessageLinkName) and an output message link name (outputMessageLinkName), and it contains several page (PageType) and link (LinkType) elements, which represent several basic elements needed for implementing an abstract service. The whole flow is entered from an input message link and finally outputs a result from an output message link. Each link defines the transferring from one page to another page, so the whole flow can be traversed along the defined links. If an execution engine encounters one page that have two simultaneously effective links, it will select the link defined first to execute. The effective link refers to that the output message has an effective definition in the page obtained actually by the execution engine.

1.2 Definition of Page (PageType)

The definition of a page mainly describes what input messages (InputMessageType) and output message (OutputMessageType) one page have (InputMessageType), what the URL accessing it is as well as some security and session (not shown) settings. The following table is the detailed description of the main attributes of the page definition in FIG. 1:

| Attribute name | Attribute description | Default attribute |
|---|---|---|
| maintainSession | It describes whether to maintain various Cookies in the process of interaction with an HTTP server. Since such information as HTTP session, SSO and etc. are all implemented depending on Cookies, if these Cookies are maintained and are sent in a plurality of times of page transferring according to the HTTP specification, various session information and SSO can he realized naturally. True indicates maintaining the Cookies. | True |
| securityMethod | It indicates what kind of authentication method to use: BASIC indicates the use of an security authentication method defined in the HTTP specification, FORM indicates the use of a method of automatically processing with respect to the WebSphere environment. If more scenarios need to be supported in the future, options can be added here and supported in the execution engine. | BASIC |
| actionType | It is a setting with respect to the most commonly used method of an HTTP request, and can be GET or POST. | GET |
| URL | It is the URL of a page, and can support HTTP or the HTTPS protocol authenticated unilaterally by a server. If the output message of a previous page in the flow is of direct link form, then this URL attribute will not function. Specifically refer to the explanation of the output message part. | |
| userName, passWord | They are information needed to authenticate a protected page. Usually the execution engine will use current safety ID of a service user to invoke web pages in the model (only supporting IBM WebSphere platform at present). If there are explicit defined usernames and passwords in the model definition, these explicit definitions will be used to perform re-authentication. | |

1.3 Definition of Input Message (InputMessageType)

When requesting a page, an HTTP client often needs append some parameters by way of GET/POST, the parameters can be represented by using the definition of input message. The definition of message is mainly to solve the issue of data structure, that is, what kind of data structure on earth the interested data is. Refer to the related part in the output message for specific explanation. By defining the data structure of input data, the input data of the existing web-based application can be represented as the input parameters of the services to be transformed. It need to indicate that the input message is generally the output message of the previous page in the flow. Therefore, the definition of message can directly refer to the definition of the output message of the previous page, which can be represented by the attribute of useOutput. The input message of the first page in the flow is the input parameters of the whole service.

1.4 Definition of Output Message (OutputMessageType)

The definition of output message mainly defines the output data concerned in one page. One page may have various scenarios, then link locating conducted based on the output data varies, so that a plurality of output messages can be defined. The execution engine will select the first found output message and use it to locate a corresponding link for proceeding the whole flow. The output message of the last page in the flow is the output result of the whole service.

The data structure of message adopts a manner similar to JavaBean to represent the data structure of message by a complex variable type (ComplexVariableType). The complex variable type can not only contain a simple variable type (SimpleVariableType), but also be embedded by a complex variable type. Such a definition is easier to be mapped when being transformed into a service interface (Java form). Meanwhile, in order to support the data of array variable type, the attribute of isArray is introduced to indicate that whether the data is an array.

The link locating of the output data of a page is also an important part in the definition of message, where a syntax similar to XPath is used to locate concerned data in an HTML page, and the attribute of "selectPath" in the variable definition is used to store path value.

For example, the path value of "/BODY/TABLE[0]/TR[1]/TD[0]/" indicates the first TD element in the second TR element in the first Table element under HTML root element BODY. Since the HTML itself is of a layered structure. Tag in the HTML is directly used to act as a path selection criteria. The following more complex example is further taken:

```
<page actionType="GET" maintainSession="true"
pageName="QueryPage"
URL="http://w3.ibm.com........">
    <outputMessage messageName="FMIDMessage">
        <complex Variable
selectPath="body/div[@id='content']/div[@id='content-main']/table/tr/
td[2]/div[@class='report-to-chain']
/div[@class='level-2']/span" variableName="String">
            <simpleVariable selectPath="a/@href"
            variableName="managerLink"
variableType="xs:string" isDirectLink="true"/>
        </complexVariable>
    </outputMessage>
    <inputMessage messageName="QueryEmployee"
    useOutput="false">
        <complex Variable selectPath=" "
        variableName="employeeName">
            <simple Variable selectPath=" "
            variableName="searchFor" variableType="string"/>
        </complexVariable>
    </inputMessage>

```

Several rules of path definition, are shown in this example;

A. If a parent variable has a plurality of child, variables of an identical type, a manner similar to array subscript can be used to define each child element, and an attribute can also be used to locate a certain element therein, such as "body/div[@id='content']/ . . . ".

B. The path of the child variable is with respect to the path of the parent variable in default, such as "selectPath= "a/@href"". If the path of the child variable begins with "/", it indicates an absolute path starting from a root path.

Such a definition can combine various elements in a page more conveniently to form a complex type variable.

C. If the definition of the simple variable type contains a hyperlink or a Submit type button, the attribute of "isDirectLink" can be made "true" to allow the execution engine to use the URL corresponded to by this link, and ignore the URL attribute m the target page definition. At this time, other element in the variable definition will act as the input message of the target page. If this attribute is not set, the attribute value will be regarded as a common character string. Only one simple variable where isDirectLink is true can be contained in a definition of one output message.

It needs to indicate that the developer does not need to spend a lot of time to set a path variable in the time of practical development. Because of its regularity, the designer can select an interested data point with reference to a corresponding page with the help of a graphic tool, then the tool can automatically generate a selection path definition corresponded to by this hot-point data.

1.5 Definition of Page Link (LinkType)

The definition of page link is relatively intuitive, which is mainly used to determine the flow of page transferring, and includes a source page name (fromPageName), a destination page name (toPageName), the name of the output message of the source page (outputMessageName) and the name of the input message of the destination page, which can provide enough information to allow the execution engine to proceed along the page links. The name of the page link of initial input is indicated in the definition of the input message link name (inputMessageLinkMame).

Figure 2:
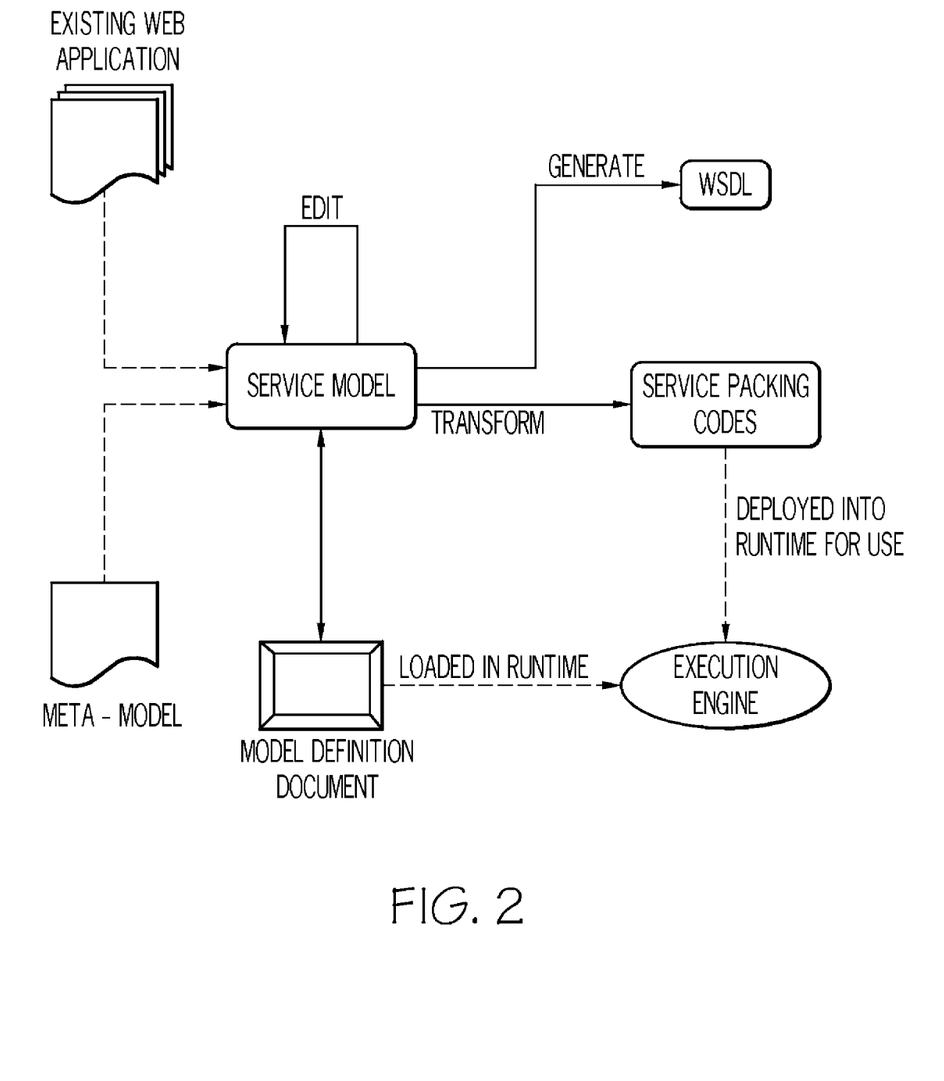
FIG. 2 illustrates a frame diagram of a method of transforming existing HTML-based page data and flow into services by using the meta-model according to an embodiment of the present invention.

FIG. 2 illustrates a frame diagram of a method of transforming existing HTML-based page data and flow into services by using the meta-model according to an embodiment of the present invention.

The method according to the present invention is divided into four steps. The first step is to analyze the legacy application, which usually contains hundreds of web pages, and it needs to identify which pages will be used in the service and reconstruct the structure of the page flow. The second step is to define the integration model, which is the core of the method according to the present invention. The model contains not only the functional specification, such as input message and output message, etc, but also the non-functional specification information, such as session handling, exception handling, etc. The third step is to transform the model into service implementation. The main task in this step is to construct the accessible interface and the model definition document (such as XML document) as well as the service description document (WSDL) according to the modeling artifacts, and generate corresponding kinds of service implementation to expose the existing web functions to services. The final step is to deploy transformation artifacts to runtime environment and test the generated services. After this, the service is ready to work, and no other codes are needed.

More specifically, a typical flow for constructing services by using the method of the present invention is as follows:

1) In order to realize a certain business function, it need to analyze what key pages and corresponding key data in the existing page structure finally obtain the needed output by what page flow.

2) Based on the analyzing result of the first step, define the access model instance needed to realize the service of the above business function. A graphic tool can be used to implement this step, which mainly comprises:

a) Define a service name, a starting page link and a final page link of the whole flow.

b) Define input and output for each page in the page flow, the output of a previous page is the input of the next page, the input of the first page of the whole flow is also the input of the whole service, and the output of the last page is the output of the whole service. It is worth noting that, since the present model being used to locate hotpoint data (i.e. data with business meaning for users) is based on a normative expression similar to the form of XPath, which can be automatically generated by a computer according to the users' selection, and when defining, the developer can select (click on) conveniently through a graphic interface tool without handwriting the location expression by himself, thus greatly facilitating the effort for model definition.

c) Define some page details such as page name, page URL (Uniform Resource Locator), security attribute, session attribute and etc., all of which are simple attributes and the developer can define conveniently by himself.

d) Define the transferring between pages. It mainly define through a link (LinkType) which output message of a source page is linked with which input message of a destination page, thus simulating the process of page transferring in human-machine interaction, if a plurality of links link to two pages simultaneously, then, in the actual execution, process, the link corresponded to by the output message of an existing first matched source page will function.

3) After completing the definition of the model, the model can be transformed into a service implementation. Corresponding service packing codes and the final deploying unit can be generated directly through the graphic interface tool. The description document of the service (WSDL) can also be generated automatically, it needs to indicated that the inventor developed a model execution engine to implement the above transformation from the model to the service implementation based on the meta-model of the present invention, so the generation of the codes mainly becomes the integrating of a data structure and the language level definition of the interface, the core of which is to use the model execution engine to simulate page transferring based on an input model document, and to obtain, a corresponding output. The developer may even handwrite the model document directly and then invoke the model execution engine to obtain a corresponding service output result. This also embodies the flexibility of the method of constructing a service according to the present invention: the meta-model itself can continuously evolve and extend, and simply by updating the execution engine and maintaining compatibility; the descriptive ability of the meta-model will become stronger and stronger and the scenarios that can be processed will also become more and more.

Figure 3:
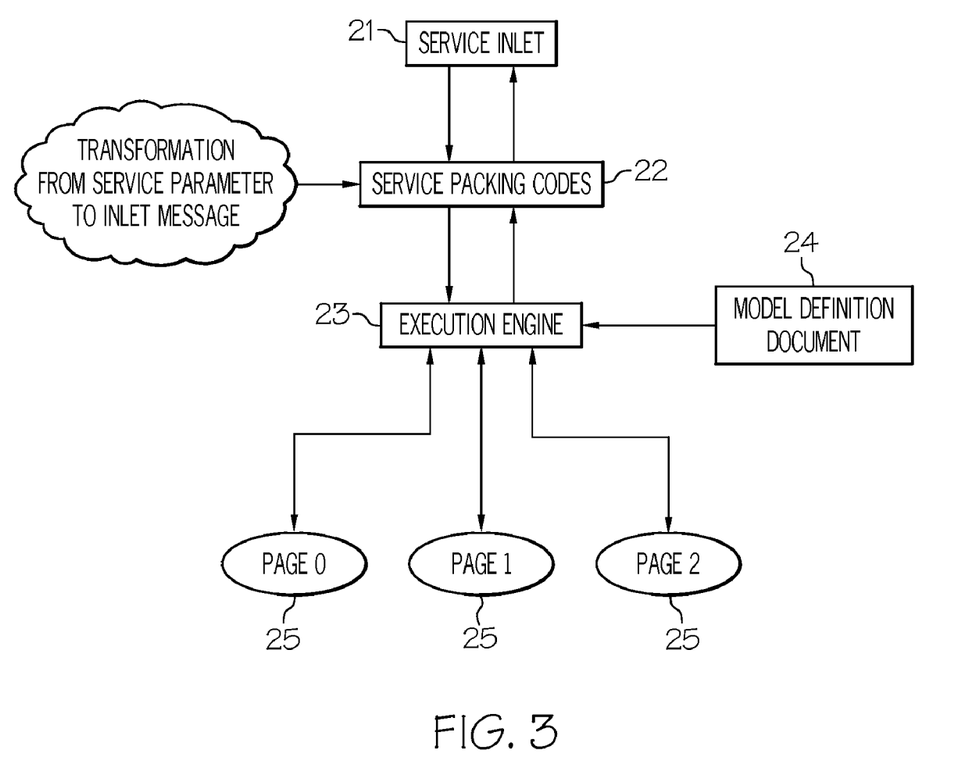
FIG. 3 illustrates a schematic structural diagram of a service-oriented system according to an embodiment of the present invention and an execution flow of the system for implementing the needed services.

4) Use the generated deploying unit to deploy the service packing codes and the model definition document into a runtime environment, so as to use the execution flow as shown in FIG. 3 to implement the needed service. The execution engine and its relation with other parts involved in FIG. 2 will be described in detail below.

FIG. 3 shows a schematic structural diagram of a service-oriented system according to an embodiment of the present invention and an execution flow of the system for implementing the needed services.

As shown in FIG. 3, the user originates a service request at a service inlet 21. Service packing codes 22 receive the service request with, service parameters, perform transformation from service parameters to an inlet message, and send the inlet message to an execution, engine 23. The execution engine 23 loads a corresponding model definition document 24, interacts with an actual page (such as pages in various web sites) 25, completes the service needed by the user and returns a result. The work flow of the execution engine 23 will be described in detail below.

By using the meta-model and the method of constructing the service according to the present invention, with the help of a visualized graphic interface, the developer can construct a new service conveniently. The main advantages are as follows;

1) It has no need to analyze the internal structure and codes of an existing web application, and can start with the presentation layer directly and the extraction of key data is direct and clear;

2) The effort of the developer is relatively low, and with the help of a tool, the definition of service only needs to do some selections and inputs on a graphic interface;

3) The meta-model and the transforming framework (execution engine) has a relatively good flexibility, is easy to extend and complement without losing conciseness.

The present invention provides a runtime execution engine for implementing automatic transformation from a web page to a reusable service. The main function of the execution engine comprises implementing the transparent transformation between a service request: data format and a web data format and masking the heterogeneity of a data presentation structure. A service inlet request is generally of an object-oriented data presentation structure, which is defined based on packing codes generated automatically by an initial input message in a model instance. The request of an intermediate page is defined by the input message in the model instance. Data content contains only business information which is meaningful for users, and needs to be transformed into request data conforming HTTP specification (GET/POST). Meanwhile, the execution engine further implements such functions as exception handling, session control and single-point logging on in the service request to increase the QoS (Quality of Service) of the interaction process. The execution engine provides a built-in support for the above functions so that the designer can construct a reusing resolution more conveniently.

Figure 4:
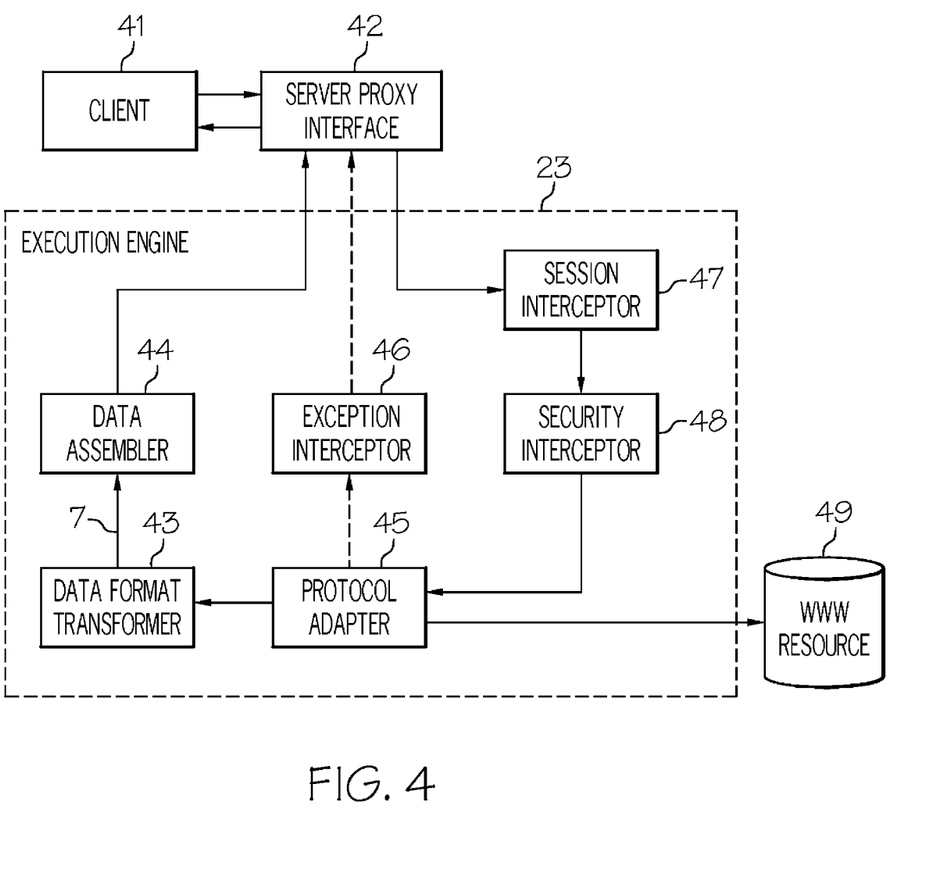
FIG. 4 illustrates the structure of an execution engine and a basic work flow thereof according to an embodiment of the present invention.

FIG. 4 shows the structure of an execution engine and a basic work flow thereof according to an embodiment of the present invention.

The execution engine 23 takes the instance of the model designed by the designer as the basis of the whole reusing process to automatically perform data transformation and protocol transformation operations. As shown in FIG. 4, from the view of runtime, when receiving a request of a user, the execution engine 23 first loads a corresponding model definition document according to the service request and then sends a service request to an external server according to the model definition in the model document. After obtaining related web pages, the execution engine 23 locates and parses a related business data block from tag trees contained in the web pages according to the definition of the model, and finally assemblies data blocks into information with business meaning for users. The whole execution process is totally executed automatically by the execution engine without any manual intervention. What the developer needs to provide is only defining a model instance in the design stage without considering superfluous details in the execution level. Such kind of developing and reusing method by model driving greatly reduces the effort of the developer and ensures the quality of the system.

As shown in FIG. 4, the execution engine 23 mainly contains the following components: a protocol adapter 45, a data format transformer 43, a data assembler 44 and an interceptor. The work flow of the system according to an embodiment of the present invention will be described below with reference to FIGS. 3 and 4.

The main function of the protocol adapter 45 is to implement the transparent transformation between a service request protocol and a web communication protocol, and the transformation process can be divided into such two steps as: service request message transformation and service response message transformation. When a user sends a service request from a client 41, its invoked object is actually service packing codes 22 generated automatically from the model defined by the developer. The service packing codes 22 provide an application-specific programming interface to the users, thus simplifying program invoking; and after being deployed into the runtime environment, the service packing codes 22 becomes a service proxy interface 42 between the user and the service which integrates the existing web-based application to be packed. After receiving an Invoking request; from the user; the service proxy interface 42 first transforms the input data set contained in the request into general parameters recognizable by the execution engine 23 (in other words, recognizable by the requested service). According to a corresponding model definition document 24, the protocol adapter 45 maps the operation and invoking of the service by the user into a specific network resource invoking flow; which is for example an invoking request recognizable by an external web site, for instance, maps the operation and invoking of the service by the user into a specific network resource address (for example, URL), and appends related invoking parameters behind the requested address. Parameter customization enables the execution engine not only to invoke static pages on the web, but also to access all the pages dynamically generated, such as the pages written using such script language as ASP, JSP or PHP. After completing the above work, the service proxy interface 42 transfer the control right to the protocol adapter 45. The protocol adapter 45 begins to establish an interaction connection with an external web site (such as WWW resource 49), sends a web page picking request and waits for a response. After receiving the service response from the external web site, the protocol adapter 45 continues to execute its process logic. Generally, the content returned by the external web site is based on character strings in the hyperlink text transfer protocol (HTTP/HTTPS). The protocol adapter 45 first stores the character strings into the internal memory, and then determines the next step of processing according to the content of header of the transmission protocol. If the content of the header of the transmission protocol indicates the normal return of external information, the protocol adapter 45 removes the protocol part related to the transmission protocol from the obtained external information, transforms the external information into a data part with a business meaning for the user, and transfers the control right to the data format transformer 43. If there is a exception, for example, a web page is unavailable or a host can not be reached to, the protocol adapter 45 skips the format transformation processing of the data format transformer 43, and transfers the control right to an exception interceptor 46 for conducting the next step of processing operation.

The main function of the data format transformer 43 is to mask the inconsistency among data presentation formats, and extract information with a explicit business meaning for the user. The web pages picked by the execution engine through the protocol adapter 45 usually use a tag language (such as HTML) for description, and one important feature of the tag language is mixing up business data and view data in a same document. This feature is very advantageous for a browser to provide a rich display effect for the user, but brings trouble for web page reusing. Based on this knowledge, the present invention uses XPath syntax to mark the position of business data in the document. From the view of the structure of web page tags, the tags contained in each document constitute one tree, and the developer can use the XPath syntax to exactly locate the position of business data in the document. The data format transformer 43 traverses the tag tree contained in the document based on the XPath syntax, and locates therein and extracts therefrom the needed information, i.e. the data related to the service request of the user. After completing the data extraction work, the data format transformer 43 provides the extracted data to the data assembler 44 for further processing. According to the output message definition in the model definition document designed by the developer, the data assembler 44 assembles the scattered data picked in the web pages into a data set with explicit business meaning, and finally returns it to the user through the service proxy interface 42 (through the client 41).

In the whole interaction process, the execution engine must further process such issues as user's security authentication and exception handling, and these functions are provided by an security interceptor 48, the exception interceptor 46 and a session interceptor 47.

The security interceptor 48 mainly solves the user's security authentication problem. When the user sends a service request, the security interceptor 48 of the execution engine first parses the security ID of the current user from the user input provided from the client 41 through the service proxy interface 42, and then passes it to the protocol adapter 45 for transferring this security ID when invoking a corresponding page. If the corresponding target page in the model instance definition has an explicit security ID definition, then the explicit security ID definition Is used to perform the security authentication of the target page again. As an example, the execution engine integrates the support for security ID transfer in IBM WebSphere platform.

The exception interceptor 46 is used to intercept exception problems emerged in the service request process. When the protocol adapter 45 has an exception during the process of interaction with the exterior, the exception interceptor 46 intercepts the exception problem from the information obtained from an external resource by the protocol adapter 45. When integrating the existing web-based application, the emerged exception problems roughly has two kinds. First, it is the problem of the runtime environment, for example, a host can not be reached to or a web page is unavailable. For these problems, there are explicit indications in the status return word of the network connection protocol. In this case, the exception interceptor 46 can provides a runtime exception according to the actual condition and stores detailed information in the runtime exception. Secondly, it is the problem that the application program execution has an exception, for example, the program execution fails, etc. At this time, according to the setting of the developer, the exception interceptor 46 will analyze the exception pages and extract exception information therefrom. Since this kind of exception case is embodied by the corresponding pages, a corresponding definition can be provided. Finally, the exception interceptor 46 returns the exception information to the user through the service proxy interlace 42 and the client 41. The exception interceptor provides a stable operation basis to the execution engine, which ensures the ability of providing an error message prompt to the user in time and effectively.

The session interceptor 47 intercepts and records the status information of the user during his interaction process with the execution engine 23 through the service proxy interface 42. Usually; most of the current web sites support the persistent storage of the access information of customers, such as user preferences and the purchased goods, and the used technique is generally Cookie in a client. The execution engine provided by the present invention uses the session interceptor 47 as a temporary Cookie library, and all the status information to be returned to the user by the client 41 is intercepted and stored by the session interceptor 47. When the user sends a service request next time, the session interceptor 47 will automatically append the related status information to the service request so as to be sent out according to the user ID, thus ensuring the status consistency of the user with an external web site, and allowing the service provided by the execution engine to be stateful.

The practical implementation according to an embodiment of the present invention will be described by taking a technical web site of Developer Works as an example with reference to FIGS. 3 and 4 below.

First, a service model instance of the technical web site is designed (defined) based on the meta-model of the present invention, which can be defined by using a graphic tool. Then the service packing codes 22 in FIG. 3 are generated automatically, thus enabling other systems to invoke the network service directly. The start point of the execution is that a user originates a service request at a service inlet 21 in FIG. 3, and the form of the request is usually based on the invoking to the function provided by the service packing codes 22. For example, the name of the invoked method the user specifies is article search, and the article name is taken as an input parameter to transfer After receiving the request, the service proxy interface 42 (service packing codes 22) loads a model definition document and passes it to the protocol, adapter 45 for processing. The protocol adapter 45 first constructs a network request. Under the scenario of the article search, the constructed network request is an HTTP request, and the requested address is http://www-128.ibm.com/developerworks/cn/search.jsp. Then the protocol adapter 45 issues the HTTP request to a external web site, if the article search for the external web site succeeds, the protocol adapter 45 will receive an HTML-based document, in which all the articles matched with, the input article name are listed, including name, author, abstract and publishing date. According to XPath syntax, the data format transformer 43 begins to traverse the tag tree of the returned document, locates the needed information, for example, selectPath="BODY[0]/TABLE[5]/TR[0]/TD[1]/TABLE[0]/TR[1]/TD[2]/B[0]", wherein it first selects a first body tag, then selects a second table tag under a sub-tag, and finally collects the result so as to send to the data assembler 44. The data assembler 44 constructs the obtained result as a data object such as an article list the user hopes to see, then returns it to the client 41 through the service proxy interface 42 for presenting to the user, thus completing the whole invoking process.

The invention claimed is:

1. A service-oriented system for integrating an existing web-based application to form a service to be provided to users, the system comprises:
a computer;
a service inlet in the computer for receiving a service request containing an input data set submitted by a user;
a service proxy interface formed by integrating the existing web-based application, for transforming the input data set in the service request submitted by the user into input parameters recognizable by-the requested service and loading a model definition document corresponding to the service according to the service request submitted by the user, the model definition document being formed by integrating the existing web-based application; and
an execution engine for interacting with an external resource according to the input parameters transformed by the service proxy interface and returning the information obtained from the external resource to the service proxy interface;
wherein the execution engine comprises a protocol adapter for performing service request message transformation and service response message transformation, wherein the service request message, transformation comprises mapping the requested operation and invoking for the service into a specific network resource invoking flow according to the loaded model definition document; and the service response message transformation comprises removing a protocol part related to a transmission protocol in the information obtained from the external resource, and transforming the information into a data part;
wherein the execution engine further comprises a data format transformer and a data assembler,
wherein the data format transformer masks inconsistency among data presentation formats, and extracts data related to the service request of the user from the data part; the data assembler assembles the data extracted by the data format transformer as a data set with a explicit business meaning according to an output message definition in the model definition document, so as to return it to the user through the service proxy interface.

2. The service-oriented system according to claim 1, wherein the execution engine further comprises a security interceptor for parsing a security ID of the current user from the input parameters transformed by the service proxy interface, and transferring the security ID when performing corresponding page invoking.

3. The service-oriented system according to claim 2, wherein if there is an explicit security ID definition for the corresponding target page in the model definition document, the explicit security ID definition is used to conduct security authentication of the target page again.

4. The service-oriented system according to claim 1, wherein the execution engine further comprises an exception interceptor for intercepting an exception emerged in the process of the interaction with the external resource.

5. The service-oriented system according to claim 1, wherein the execution engine further comprises a session interceptor for intercepting and recording status information of the user dining his interaction with the execution engine, and when the user sends a service request next time, the session interceptor automatically appends the related status information to the service request so as to be sent out according to the user's ID, thus ensuring status consistency of the user with the external resource.

6. The service-oriented system according to claim 1, wherein the formation of the service proxy interface comprises: using a meta-model to conduct a model definition for the existing web-based application, transforming the model definition into service packing codes and a final deploying unit by using a graphic interface tool, and deploying the service packing codes into a runtime environment, thus forming the service proxy interface.

7. The service-oriented system according to claim 6, wherein the meta-model used for integrating the existing web-based application comprises at least one of:
- a service definition that acts as a root node of the meta-model, has a service name, an input message link name and an output message link name, and contains a number of pages and link elements;
- a page definition for describing a input message, a output message, a URL for accessing it and a security and session setting, which contained in the page;
- an input message definition for defining data structure of the input data, so as to represent the input data of the existing web-based application as the input parameters of the service to be transformed;
- at least one output message definition for defining data structure of output data with a explicit business meaning for the user; and
- a page link definition for determining a flow of page transferring, including source page name, destination page name, output message name of the source page and input message name of the destination page, so as to enable the execution engine to proceed along the page link.

8. The service-oriented system according to claim 7, wherein the input message definition and the output message definition further comprises a simple variable type definition and a complex variable type definition, wherein the complex variable type contains the simple variable type or is embedded in another complex variable type.

9. The service-oriented system according to claim 7, wherein a syntax is used to locate data related to the user's service request in an HTML page.

10. A method of providing a service to users, the service bring formed by integrating an existing web-based application, the method comprising:
- providing a service inlet in a computer;
- receiving a service request containing an input data set submitted by a user at the service inlet;
- transforming the input data set in the service request submitted by the user into input parameter recognizable by the requested service using a service proxy and loading a model definition document corresponding to the service according to the service request submitted by the user, the model definition document being formed by integrating the existing web-based application; and
- interacting with an external resource according to the transformed input parameters and returning information obtained from the external resource to the user;
- wherein interacting with the external resource comprises performing request message transformation and service response message transformation by protocol adapter,
- wherein, the service request message transformation comprises mapping the requested operation and invoking for the service into a specific network resource revoking flow according to the loaded model definition document; and the service response message transformation comprises removing a protocol part related to a transmission protocol in the information obtained from the external resource, and transforming the information into a data part;
- masking inconsistency among data presentation formats, and extracting data related to the service request of the user from the data part; and
- assembling the extracted data related to the service request of the user as a data set with a explicit business meaning according to an output message definition the model definition document so as to return it to the user.

11. The method according to claim 10, further comprising: parsing a security ID of the current user from the transformed input parameters recognizable by the service, for transferring the security ID when performing corresponding page invoking.

12. The method according to claim 11, wherein if there is an explicit security ID definition for the corresponding target page in the model definition document, the explicit security ID definition is used to conduct security authentication of the target page again.

13. The method according to claim 10, further comprising intercepting an exception emerged in the process of the interaction with the external resource.

14. The method according to claim 10, further comprising intercepting and recording status information of the user during the user's interaction with an execution engine, and when the user sends a service request next time, automatically appending the related status information to the service request so as to be sent out according to the user's ID, thus ensuring status consistency of the user with the external resource.

15. The method according to claim 10, wherein the formation of the service by integrating the existing web-based application comprises: using a meta-model to conduct a model definition for the existing web-based application, transforming the model definition into service packing codes and a final deploying unit by using a graphic interface tool, and deploying the service packing codes into a runtime environment.

16. The method according to claim 15, wherein the meta-model used for integrating the existing web-based application comprises at least one of:
- a service definition that acts as a root node of the meta-model, has a service name, an input message link name and an output message link name, and contains a number of pages and link elements;
- a page definition for describing an input message, a output message, a URL for accessing it and a security and session setting, which contained in the page;
- an input message definition for defining data structure of the input data, so as to represent the input data of the existing web-based application as the input parameters of the service to be transformed;
- at least one output message definition for defining data structure of output data; and
- a page link definition for determining a flow of page transferring, including source page name, destination page name, output message name of the source page and input message name of the destination page, so as to enable the execution engine to proceed along the page link.

17. The method according to claim 16, wherein the input message definition and the output message definition further comprises a simple variable type definition and a complex variable type definition, wherein the complex variable type contains the simple variable type or is embedded in another complex variable type.

18. The method according to claim 16, wherein a syntax is used to locate data related to the user's service request in an HTML page.

19. A method of integrating an existing web-based application into a service, comprising steps of:
- providing a meta-model in a computer;
- conducting service model definition for the existing web-based application according to the meta-model;
- transforming service model into service packing codes and a model definition document of the service; and deploying the service packing codes to generate a service proxy interface in a runtime environment;

a service definition that acts as a root node of the meta-model, has a service name, an input message link name and an output message link name, and contains a number of pages and link elements;

a page definition for describing an input message, an output message, a URL for accessing it and a security and session setting, which contained in the page;

an input message definition for defining data structure of the input data, so as to represent the input data of the existing web-based application as the input parameter of the service to be transformed;

at least one output message definition for defining data structure of output data; and a page link definition for determining a flow of page transferring, including source page name, destination page name, output message name of the source page and and input message name of the destination, page, so as to enable the execution engine to proceed along the page link, wherein the input message definition and the output message definition further comprises a simple variable type definition and a complex variable type definition, wherein the complex variable type contains the simple variable type or is embedded in another complex variable type.

20. The method according to claim 19, wherein a syntax is used to locate data related to the user's service request in an HTML page.

21. The method according to claim 19, further comprising providing an execution engine for executing the service requested by a user through the service proxy interface according to the service model definition document loaded in runtime.

* * * * *